United States Patent
Hehl

[11] 3,782,874
[45] Jan. 1, 1974

[54] INJECTION MOLDING MACHINE

[76] Inventor: Karl Hehl, Siedlung 183, Lossburg/Wurtt, Germany

[22] Filed: Mar. 10, 1972

[21] Appl. No.: 233,472

[30] Foreign Application Priority Data
Mar. 15, 1971 Germany............... P 21 12 311.5

[52] U.S. Cl. ............................. 425/190, 425/450
[51] Int. Cl. .............................................. B29f 1/00
[58] Field of Search............. 425/242, 450, 193, 425/192, 190

[56] References Cited
UNITED STATES PATENTS

| | | | |
|---|---|---|---|
| 3,674,400 | 7/1972 | Sauerbruch et al. | 425/242 X |
| 3,669,599 | 6/1972 | Snider et al. | 425/242 |
| 2,705,991 | 4/1955 | Reiner | 151/41.71 |
| 3,456,706 | 7/1969 | Ollis, Jr. | 151/41.71 |
| 2,034,948 | 3/1936 | Knapp | 16/45 |
| 2,541,514 | 2/1951 | Herold | 16/46 |
| 3,564,658 | 2/1971 | Hehl | 425/188 |
| 3,435,483 | 4/1969 | Heiner et al. | 425/192 X |
| 3,584,109 | 6/1971 | Meadors et al. | 425/193 X |

Primary Examiner—J. Spencer Overholser
Assistant Examiner—David S. Safran
Attorney—George H. Spencer et al.

[57] ABSTRACT

An injection molding machine including a horizontal mold clamping unit, a mold and a machine base. The mold clamping unit includes a cylinder carrying mold assembly, a movable mold carrier member and structure for connecting the cylinder carrying mold assembly and the carrier member. The machine base is provided with detachable fasteners and the cylinder carrying mold assembly is provided with detachable fasteners so that it can be selectively connected to the machine base either directly or in operative association with a mold mounting unit. The mold mounting unit also includes detachable fasteners and is arranged to be able to simultaneously constitute a support for the movable mold carrier member and a connecting unit for connecting the cylinder carrying mold assembly to the machine base by the mutual engagement of the detachable fasteners on the various members.

5 Claims, 12 Drawing Figures

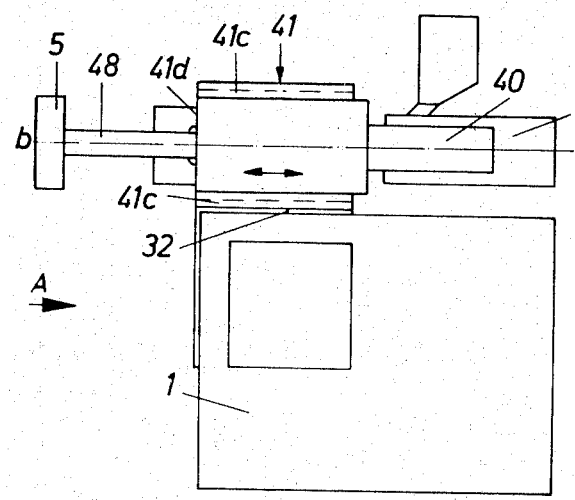
Fig. 6
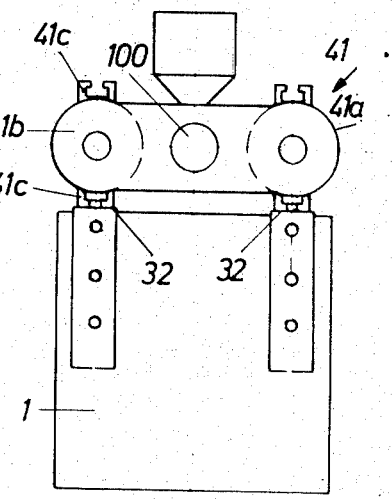
Fig. 7
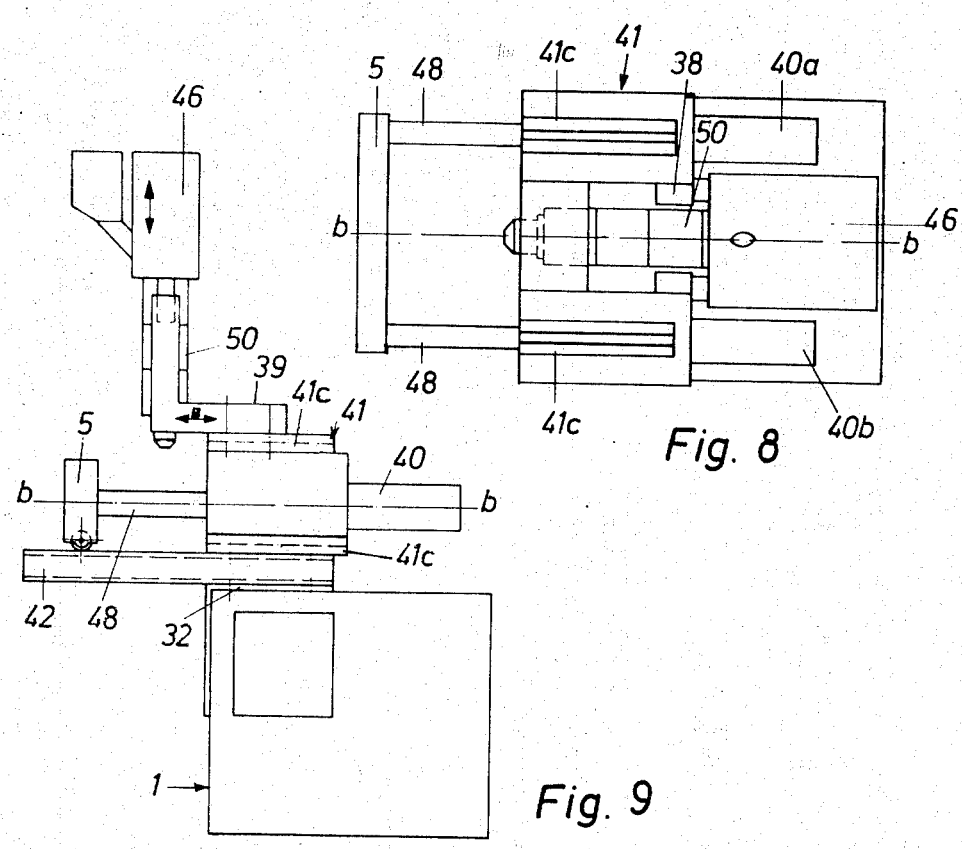
Fig. 8
Fig. 9

INJECTION MOLDING MACHINE

BACKGROUND OF THE INVENTION

The present invention relates to injection molding machines, and more particularly to an injection molding machine including a horizontal mold clamping unit supported at a defined edge area of the machine base. The mold clamping unit supporting at a vertical frontal face thereof a stationary mold half and freely carrying, via struts, the movable mold carrier member for the movable mold half. The mold carrier being carried in a region horizontally spaced from the area covered by the machine base, and being supported by the mold clamping unit.

The phrase "edge area of the machine base" is understood to mean an upper approximately linear edge of the machine base which is disposed perpendicularly to the opening or closing movement, respectively, of the mold clamping unit.

A known injection molding machine of the type described is characterized by its compact construction and, due to the support of the movable mold carrier, by a high centering accuracy for the mold halves.

SUMMARY OF THE INVENTION

It is a general object of the present invention to provide an injection molding machine of the abovementioned type where production thereof is rendered more economical as a result of the utilization of modular units.

It is a more specific object of the present invention to provide an injection molding machine in which the machine base is provided with detachable fastening means, the cylinder carrying mold assembly is provided with detachable fastening means so that it can be selectively connected to the machine base either directly or in operative association with a mold mounting unit.

It is a related specific object of the present invention to provide an injection molding machine in which the mold mounting unit is arranged to simultaneously constitute a support for the movable mold carrier members and a connecting unit for connecting the cylinder carrying mold assembly to the machine base by the mutual engagement of the detachable fastening means.

These and other objects are accomplished according to the present invention by the provision in an injection molding machine of a machine base, a cylinder carrying mold assembly and a mold mounting unit each with detachable fastening means. The cylinder carrying mold assembly which supports the stationary mold half is selectively connected to the machine base either directly or through an operative association with a mold mounting unit, with the mold mounting unit being arranged to simultaneously constitute a support arm for the movable mold carrier and a connecting unit for connecting the cylinder carrying mold assembly to the machine base.

With the injection molding machine according to the present invention it is possible to establish a production program with standardized modules, i.e., with standardized machine bases, standardized mold clamping units, standardized mold mounting units and standardized injection units; and to offer the users of injection molding machines a single purpose machine which best meets his requirements and which has been produced in an economical mass production process. If the potential users' needs and requirements are based on operation with light-weight molds, the machine is delivered without the mold mounting unit. The cylinder carrying mold assembly holding the stationary mold half is connected directly to the connecting surface of the machine base. If the needs and requirements of the potential user are such that he operates with heavy molds, the machine is delivered with a mold mounting unit so that the mold clamping unit and more specifically the cylinder carrying mold assembly is then connected with the connection surface of the machine base via the mold mounting unit.

Machines already in use can of course also be appropriately modified if the requirements of the customer change. A further variation based on the module principle according to the present invention results for specific requirements when the machine base has a vertical connecting surface which borders the defined edge area and which corresponds to the horizontal connecting surface. In this case the machine can be furnished without the mold mounting unit with a direct connection of the cylinder carrying mold assembly, which carries the stationary mold half, to the vertical connecting surface of the machine base.

Advisably, the cylinder carrying mold assembly holding the stationary mold half is a cast mold unit containing the pressure cylinders and provided with a carriage: the movable mold carrier is disposed on the outward extension of the piston rods of the pressure cylinders; and the mold mounting unit is provided with a plate-type section disposed within a surface area of the machine base, and two supporing arms, with the supporting arms extending in the direction of the movable mold carrier and connected together by a traverse support.

With a configuration of the injection molding machine according to the present invention, the life time of the hydraulic system of the injection molding machine when provided with a mold mounting unit for operation with heavy molds can be decisively increased because the piston rods and thus the pistons of the pressure cylinders are completely relieved of the weight of the movable mold half.

In the above sense the term "pressure cylinder" is to be understood to identify the hydraulic drive cylinders with which the closing pressure for the mold is built up.

A further variation resulting from the module principle according to the present invention is that the mold mounting unit can be selectively replaced by an analogously designed pivot arm which is connected with the machine base via a pivot axis extending along the upper front edge of the machine base.

BRIEF DESCRIPTION OF THE DRAWINGS

FIG. 6 is a side view in elevation of the injection molding machine with a cylinder carrying mold unit directly on the machine base in accordance with the present invention.

FIG. 7 is an end view of the injection molding machine illustrated in FIG. 6 taken in the direction A of FIG. 6 but without the mold carrier for the movable mold half.

FIG. 8 is a plan view of the injection molding machine according to the present invention as illustrated in FIGS. 6 and 7.

FIG. 9 is a side view in elevation of the injection molding machine of FIGS. 6 to 8 illustrating the cylinder carrying mold assembly which is indirectly connected to the molding machine base via a mold mounting unit in accordance with the present invention.

DESCRIPTION OF THE PREFERRED EMBODIMENTS

Referring now in more detail to the drawings, a block-shaped machine base 1 is illustrated. The block-shaped machine base 1 serves as the machine base of the injection molding machine of the present invention. The machine base 1 has an upper front edge 30 which is limited in a horizontal transverse direction by the connecting ledges 32, 33. The upper front edge 30 is an approximately linear edge of the machine base extending along the line a—a shown more clearly in FIG. 10. The line a—a is perpendicular to the center line b—b of the mold clamping unit as shown in FIG. 6.

Figure 1:
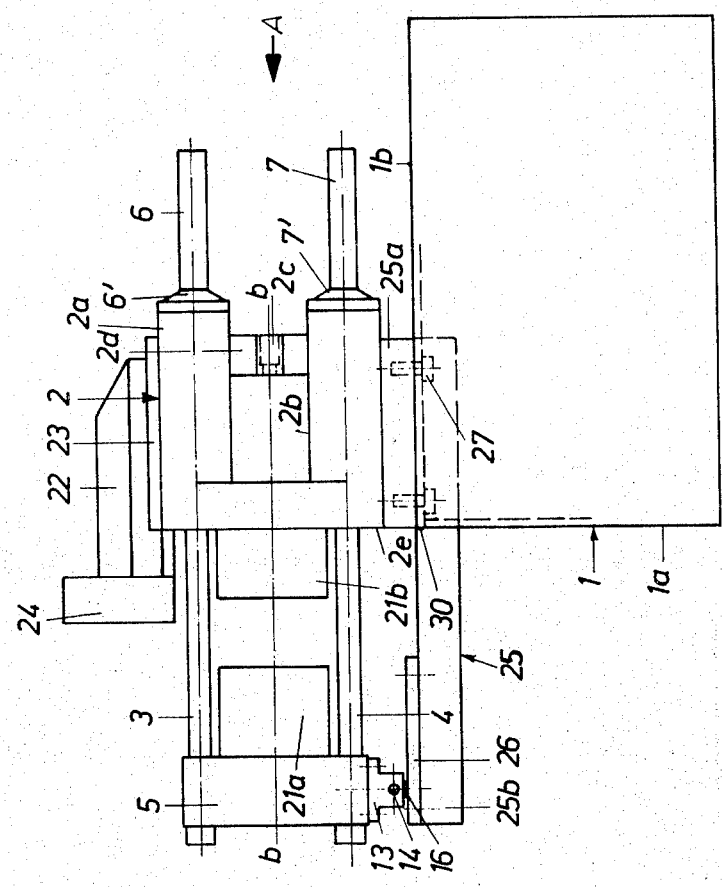
FIG. 1 is a side view in elevation of the injection molding machine with a mold mounting unit which is fixedly attached to the molding machine base in accordance with the present invention.
Figure 10:
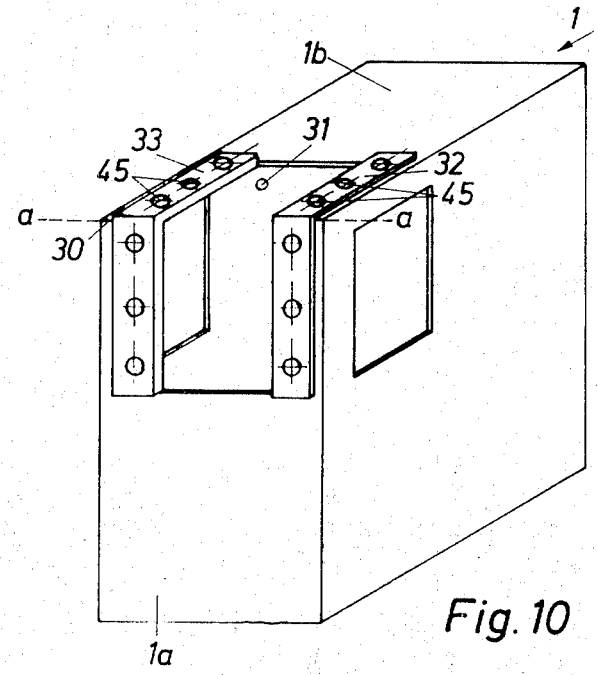
FIG. 10 is a perspective view of the molding machine base in accordance with the present invention.
Figure 11:
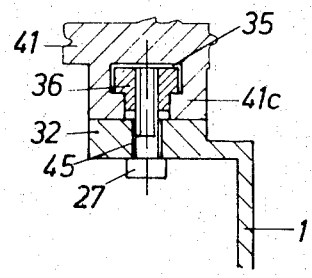
FIG. 11 is a view in cross section illustrating to an enlarged scale details of the connecting members for connecting the cylinder carrying mold assembly to the molding machine base.

As can be seen particularly in FIGS. 1, 10 and 11, the horizontal connecting ledges 32, 33 are wall portions of the machine base 1. The connecting ledges 32, 33 are provided with linearly disposed holes 45 for receiving therein screw bolts 27. The inner edges of the connecting ledges 32, 33 define, along with a transverse edge of upper surface 16 of the machine base 1, a recess 31. The walls of the machine base are thicker in the area of the connecting ledges, that is, the ledges 32, 33 have a greater thickness than the walls of the machine base.

Figure 2:
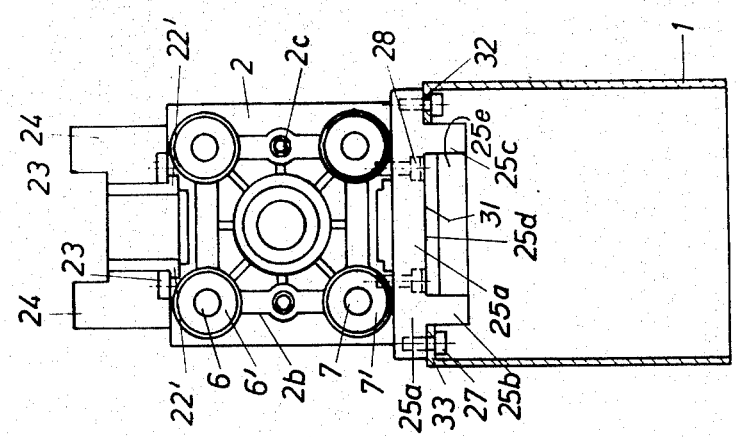
FIG. 2 is an end view of the injection molding machine illustrated in FIG. 1, taken in the direction A of FIG. 1.

In the embodiments of FIGS. 1-5, the hydraulic drive or pressure cylinders 2a, 2b of the mold clamping unit constitute an approximately square block-type unit which will be referred to hereinafter as the cylinder carrying mold assembly 2. An injection unit (not shown) which operates to inject transversely of the parting line formed by the mold halves 21a, 21b can be connected to the cylinder carrying mold assembly 2. The supporting struts (also not shown) of the injection unit can be centered with respect to the mold assembly 2 by connecting sleeves 2c which are inserted into vertical bars 2d of the cylinder carrying mold assembly 2. The vertical bars 2d are shown in FIG. 2 to extend between two vertically aligned pressure cylinders. Drive cylinders 6, 7 are coaxially connected to the pressure cylinders by means of flanges 6', 7'. The drive cylinders 6, 7 serve to open or close, respectively, the mold along its parting line.

An injection unit (not shown) which operates to inject longitudinally into the parting line of the mold halves 21a, 21b can be connected to the cylinder carrying mold assembly 2 with the aid of a carriage 22 shown in FIGS. 1 and 2. The supporting struts of the injection unit are held by the connecting sleeves 24 of the carriage 22. The carriage 22 is displaceable in a guide 23 of the cylinder carrying mold assembly 2 in the opening and closing direction of the mold clamping unit.

The stationary mold half 21b is supported at the frontal side 2e of the cylinder carrying mold assembly 2, while a movable mold half carrier support 5 for the other or movable mold 21a is supported on the piston rods 3, 4 which extend outwardly from the pressure cylinders of the cylinder carrying mold assembly 2. Although reference has been made to two pressure cylinders 2a, 2b and two piston rods 3, 4 for clarity, it should be understood that in FIGS. 1-5 four pressure cylinders and four piston rods are utilized. The carrier 5 is supported by he piston rods 3, 4 outside of the cross-sectional area of the machine base 1, that is, outwardly from the front vertical surface 1a of the machine base 1 as shown in FIGS. 1 and 3.

The cylinder carrying mold assembly 2 can selectively be connected, either directly (not shown) or via a separate mold mounting unit 25 (FIGS. 1, 2 and 3), with the horizontal connecting ledges 32, 33 of the machine base 1. The mold mounting unit 25 extends beyond the cross-sectional area of the machine base 1, that is it extends outwardly from the front vertical surface 1a of the machine base 1 and to an extent sufficient to accommodate the maximum stroke of the movable mold carrier 5. The mounting unit 25 is provided with a plate-shaped section 25a within the cross-sectional area of the machine base 1 and two supporting arms 25b, 25c which are movable in the direction of the movable mold carrier 5. The supporting arms 25b, 25c are connected together (shown in FIG. 5 which can have the form of bar) by a transverse bar 36. The plate-shaped section 25a of the mold mounting unit 25 is clamped to the connecting ledges 32, 33 by the bolts 27. The connection is made in such a manner that the planar lower surface 25d of the plate-shaped section 25a lies in the recess 31 and approximately in the plane of the surface 1b of the machine base 1. The mold mounting unit 25 has the cylinder carrying mold assembly 2 and thus the clamping unit connected thereto by means of the screw bolts 28 as shown in FIG. 2.

Figure 4:
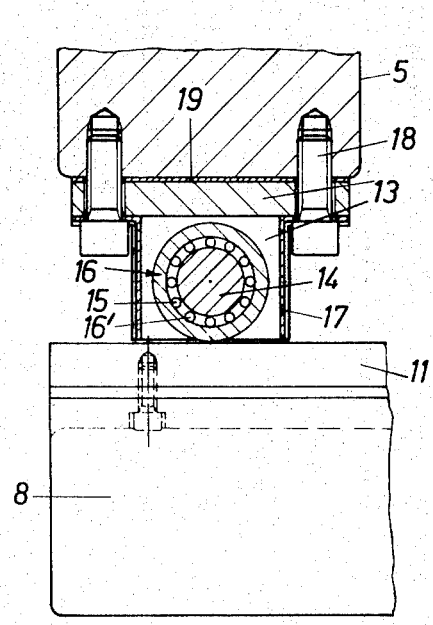
FIG. 4 is a partial cross-sectional side view in elevation of the injection molding machine of FIG. 3 illustrating details of a movable carrier member roller.
Figure 5:
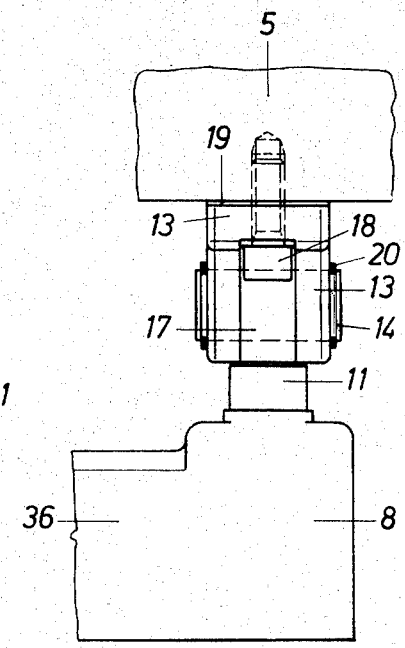
FIG. 5 is an end view of the roller illustrated in FIG. 4 rotated by 90°.

The surfaces of the supporting arms 25b, 25c are provided with hardened guide paths 26 as shown in FIG. 1. The mold carrier 5 is provided with rollers 16 at its underside, which are displaceable along the guide paths 26. The rollers 16 are each mounted in a supporting roller housing 13. The rollers 16 each include a bearing pin 14 which is supportingly disposed in the housing 13. The bearing pins 14 serve as the inner races of the rollers 16. The rollers 16 further include a ball bearing cage 15, as seen in FIG. 4. The ball bearing cages 15 and the pins 14 define a space within which the ball bearings 16' are inserted. The open frontal faces of the supporting roller housing 13 are covered by means of strippers 17. The strippers 17 are preferably formed of plastic-covered metal sheets.

Figure 3:
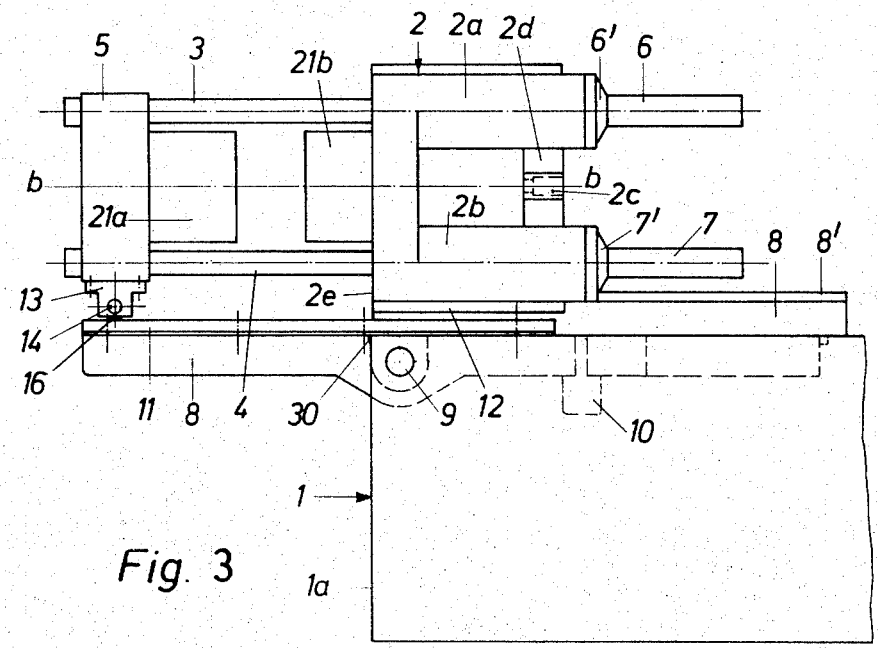
FIG. 3 is a side view in elevation of the injection molding machine with a mold mounting unit which is pivotally attached to the molding machine base in accordance with the present invention.

In FIG. 3 the mold mounting unit is replaced by a pivot arm 8 having a shape analogous to that of the mold mounting unit 25. The pivot axis 9 of the pivot arm 8 extends parallel to the upper front edge 30 of the machine base 1. The cylinder carrying mold assembly 2 is connected with the pivot arm 8 by means of clamping strips 12. The clamping strips 12 are connected to the bottom pressure cylinders shown in FIG. 3 and, extend behind the angled guide paths 8' of the pivot arm 8. The strips 12 are mounted to the cylinder carrying mold assembly 2 with vertical screws on the bottom of the cylinder 2b. They are adjacent to the lower surface of the guide path 8'. If the screws are fastened, the assembly 2 is clamped to the pivot arm. In this manner the cylinder carrying mold assembly 2 can be axially displaced in the opening and closing direction of the mold clamping unit.

The pivot arm 8 is provided with connecting sleeves 10 for connecting an injection unit (not shown) when the mold clamping unit is pivoted into its vertical position.

Referring now to FIGS. 6–12, the cylinder carrying mold assembly 41 forms two pressure cylinders 41a, 41b and therefore has an approximately rectangular cross section. The cylinder carrying mold assembly 41 is provided with a central channel 100 for the passage of a plasticizing cylinder 50 of an injection unit 46. The injection unit 46, as shown in FIGS. 6–8, is connected with the mold clamping unit so that the injection axis is coincident with the mold closing unit center line b—b.

On at least two longitudinal sides the cylinder carrying mold assembly 41 is provided with connecting members 41c. The connecting members 41c are such that the cylinder carrying mold assembly 41 can be fastened either directly, as shown in FIGS. 6 and 7, or indirectly via a mold mounting unit 42, as shown in FIG. 9, to the connecting ledges 32, 33. The connecting ledges 32, 33 are raised slightly above the upper surface 1b of the machine base 1, as shown in FIG. 11. The connecting members 41c define grooves 35 within which abutment elements or threaded inserts 36 are disposed. The inserts 36 are engageable with the screw bolts 27 for connecting the mold assembly 41 directly to the machine base 1, as shown in FIGS. 6–8 and 11.

Figure 12:
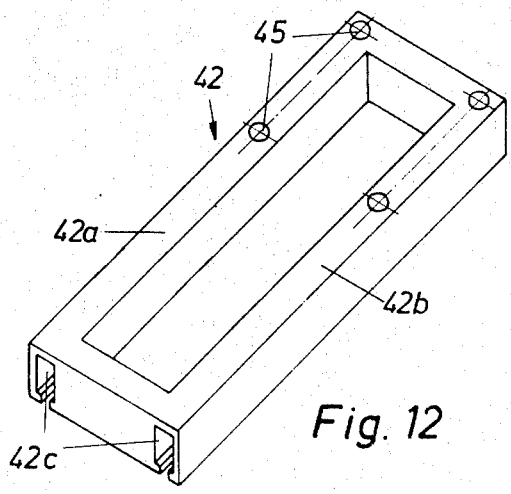
FIG. 12 is a perspective view illustrating the mold mounting unit of FIG. 9.

If the cylinder carrying mold assembly 41 is to be connected indirectly to the machine base 1, a frame-type mold mounting unit 42 as shown in FIGS. 9 and 12 is provided. The mounting unit 42 has a pair of longitudinal arms 42a, 42b which define grooves 42c therein. The grooves 42c are similar to the grooves 35 and serve the same function. In order to mount the cylinder carrying mold assembly 41 to the mounting unit 42, the longitudinal arms 42a, 42b are also provided with holes 45.

The cylinder carrying mold assembly supports at its frontal face 41d the stationary mold half (not shown). The other or movable mold half is mounted to the movable carrier 5 which, in turn, is mounted on the piston rods 48 of the pressure cylinders 41a, 41b. The drive cylinders 40a, 40b which are coaxially flanged to the pressure cylinders 41a, 41b, respectively, serve to open and, if so desired, also to close the mold.

The injection unit 46 is centered in sleeves 38 of the cylinder carrying mold assembly 41 for injection transverse to the parting line of the mold. With the aid of a carriage 39, shown in FIG. 9, the cylinder carrying mold assembly 41 is connected to an injection unit 46 for injection unit operation longitudinally of the parting line of the mold. The carriage 39 is connected via upper connecting members 41c to the mold assembly 41 so that it can be adjusted in these members in the direction B.

It will be understood that the above description of the present invention is susceptible to various modifications, changes and adaptations, and the same are intended to be comprehended within the meaning and range of equivalents of the appended claims.

I claim:

1. In an injection molding machine including a horizontal mold clamping unit, a mold, and a machine base, with the clamping unit supported at a defined edge area of the machine base, the mold clamping unit including a cylinder carrying mold assembly having a vertical frontal side, the assembly including a cast unit containing pressure cylinders, piston rods extending outwardly from said cylinders, and a movable mold carrier member mounted on said piston rods so as to be supportable by said cylinder carrying mold assembly, the mold including a stationary mold half and a movable mold half, with the stationary mold half being mounted to the vertical frontal side of the cylinder carrying mold assembly and the movable mold half being disposed in a region horizontally spaced from the area covered by the machine base and being carried by the movable mold carrier member, and with the stationary mold half having means associated therewith for connecting thereto an injection unit for injection operation transverse to the parting line defined by the mold halves, the improvement comprising: a mold mounting unit; detachable fastening elements associated with said mounting unit, said cylinder carrying mold assembly and said machine base; and means on said machine base defining strip-shaped connecting surfaces provided with linearly disposed bores for reception of said fastening elements; said fastening elements being constructed, and constituting means, for selectively either connecting said cylinder carrying mold assembly directly to said connecting surfaces of said machine base or connecting said cylinder carrying mold assembly directly to said mounting unit and connecting said mounting unit directly to said connecting surfaces of said machine base; and said mold mounting unit constituting means for supporting said movable mold carrying member; whereby when said cylinder carrying mold assembly is connected directly to said connecting surfaces of said machine base said movable mold carrier member is freely suspended beyond the area covered by said machine base and is supported only by said clamping unit, via said piston rods, and when said cylinder carrying mold assembly is connected directly to said mounting unit said movable mold carrier member is supported by said mounting unit.

2. An injection molding machine as defined in claim 1, wherein said mold mounting unit is provided with a plate-shaped section, two supporting arms extending from said plate-shaped section in the direction of the movable mold carrier and a transverse bar connected between said supporting arms, said plate-shaped section when mounted to the machine base being disposed within a surface area thereof.

3. An injection molding machine as defined in claim 2, wherein said plate-shaped section is fastened with said connecting surfaces of the machine base in such a manner that the planar lower surface of said plate-shaped section lies approximately in the plane of the upper surface of the machine base.

4. In an injection molding machine including a horizontal mold clamping unit, a mold, and a machine base, with the clamping unit supported at a defined edge area of the machine base, the mold clamping unit including a cylinder carrying mold assembly having a vertical frontal side, a movable mold carrier member and means connecting the cylinder carrying mold assembly and the carrier member, the mold including a stationary mold half and a movable mold half, with the stationary mold half being mounted to the vertical frontal side of the cylinder carrying mold assembly and the movable mold half being disposed in a region horizontally spaced from the area covered by the machine base and being carried by the movable mold carrier member, and with the stationary mold half having means associated therewith for connecting thereto an injection unit for injection operation transverse to the parting line defined by the mold halves, the improvement comprising: a mold mounting unit formed as a pivotal unit and provided with a plate-shaped section, two supporting arms extending from said plate-shaped section in the direction of the movable mold carrier, and a transverse bar connected between said supporting arms, said plate-shaped section, when said mounting unit is mounted to the machine base, being disposed within the area covered by the machine base; and a pivot pin extending along the upper front edge of the machine base and detachably connecting said mold mounting unit to the machine base; wherein the machine base and the cylinder carrying mold assembly are provided with detachable fastening means which, together with said pivot pin, constitute means for selectively either connecting said cylinder carrying mold assembly directly to said machine base or connecting said cylinder carrying mold assembly directly to said mounting unit and connecting said mounting unit directly to said machine base; and said mold mounting unit constituting means for supporting said movable mold carrying member; whereby when said cylinder carrying mold assembly is connected directly to said machine base said movable mold carrier member is freely suspended beyond the area covered by said machine base and is supported only by said clamping unit, and when said cylinder carrying mold assembly is connected directly to said mounting unit said movable mold carrier member is supported by said mounting unit.

5. An injection molding machine as defined in claim 1 wherein said cylinder carrying mold assembly further comprises a carriage for selectively supporting such injection unit for injection operation longitudinally into the parting line defined by the mold halves.

* * * * *